United States Patent
Cabodi et al.

(10) Patent No.: US 12,421,151 B2
(45) Date of Patent: Sep. 23, 2025

(54) CORNER BLOCK FOR GLASS FURNACE

(71) Applicant: SAINT-GOBAIN CENTRE DE RECHEROCHES ET D'ETUDE EUROPEEN, Courbevoie (FR)

(72) Inventors: Isabelle Cabodi, Cavaillon (FR); Pierrick Vespa, Aix-en-Provence (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 470 days.

(21) Appl. No.: 17/779,448

(22) PCT Filed: Nov. 25, 2020

(86) PCT No.: PCT/EP2020/083416
§ 371 (c)(1),
(2) Date: May 24, 2022

(87) PCT Pub. No.: WO2021/105238
PCT Pub. Date: Jun. 3, 2021

(65) Prior Publication Data
US 2022/0388885 A1    Dec. 8, 2022

(30) Foreign Application Priority Data
Nov. 25, 2019   (FR) ........................................ 1913149

(51) Int. Cl.
*C03B 5/42*    (2006.01)
*F27D 1/04*    (2006.01)
*F27D 1/00*    (2006.01)

(52) U.S. Cl.
CPC ................. *C03B 5/42* (2013.01); *F27D 1/04* (2013.01); *F27D 2001/0059* (2013.01)

(58) Field of Classification Search
CPC ..... C03B 5/42; C03B 5/43; F27D 1/04; F27D 2001/0059; F27D 2001/0066; F27D 1/00; F27D 5/0012; F27D 5/0031
See application file for complete search history.

(56) References Cited

U.S. PATENT DOCUMENTS 2,297,286 A * 9/1942 Book ..................... F27D 5/0012
432/258
9,714,792 B2 * 7/2017 Sonntag ................. F27D 5/0012

FOREIGN PATENT DOCUMENTS

CN    106746498 A *    5/2017
DE       717505 C      2/1942
(Continued)

OTHER PUBLICATIONS

International Search Report corresponding to International Application No. PCT/EP2020/083416, dated Feb. 15, 2021, 6 pages.

*Primary Examiner* — Gregory A Wilson
(74) *Attorney, Agent, or Firm* — Ronald M. Kachmarik; Cooper Legal Group LLC

(57) ABSTRACT

A corner block for a glass furnace tank. The corner block has an outer surface including: upper and lower surfaces delimiting the length of the corner block, right and left surfaces to be in contact with corresponding surfaces of adjacent blocks, a hot face to be in contact with the environment inside the tank, and a cold face, opposite the hot face. A main portion of the corner block extends, over more than 80% of the length of the corner block, between two limiting upper and lower transverse planes. The hot face is edge-free. An edge is a line along which the hot face has a break in slope greater than 25°. The hot face has a profile that is convex in any transverse sectional plane in the main portion.

18 Claims, 5 Drawing Sheets

(56) References Cited

FOREIGN PATENT DOCUMENTS

| | | | | |
|---|---|---|---|---|
| DE | 3933414 | A * | 4/1991 | ............... F23M 5/02 |
| EP | 0763636 | A1 * | 3/1997 | |
| FR | 3004508 | A1 * | 10/2014 | ............. F17C 3/027 |
| FR | 3079829 | A1 | 10/2019 | |
| JP | 2933836 | B2 * | 8/1999 | |
| WO | WO-2019012236 | A1 * | 1/2019 | ............. F17C 3/027 |

* cited by examiner

[Fig 1]
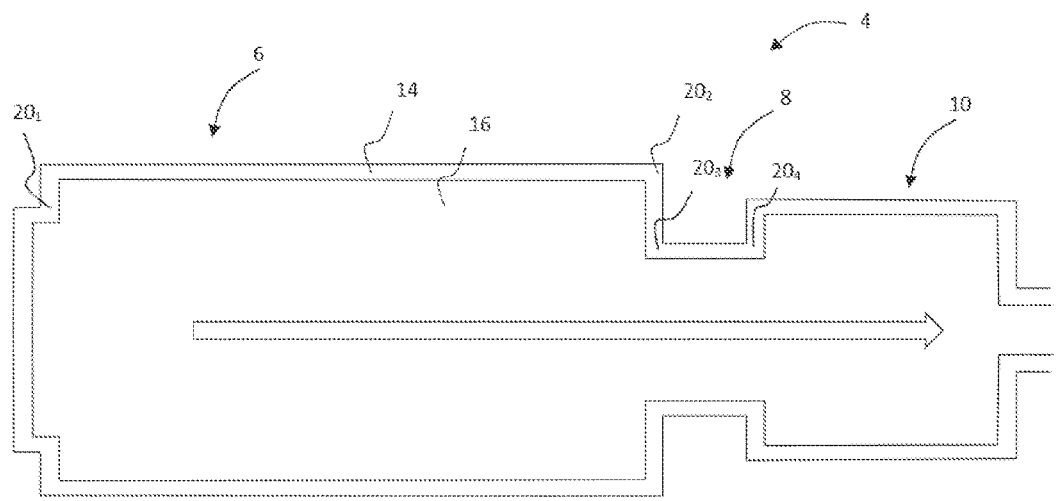
[Fig 2]
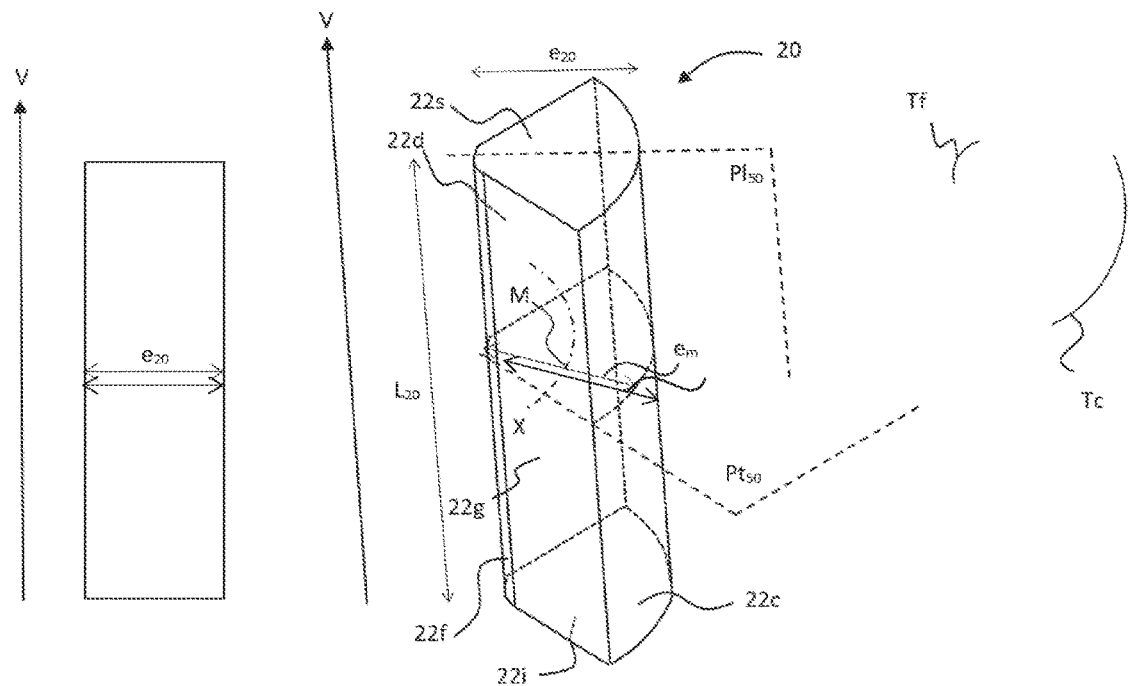

[Fig 3]
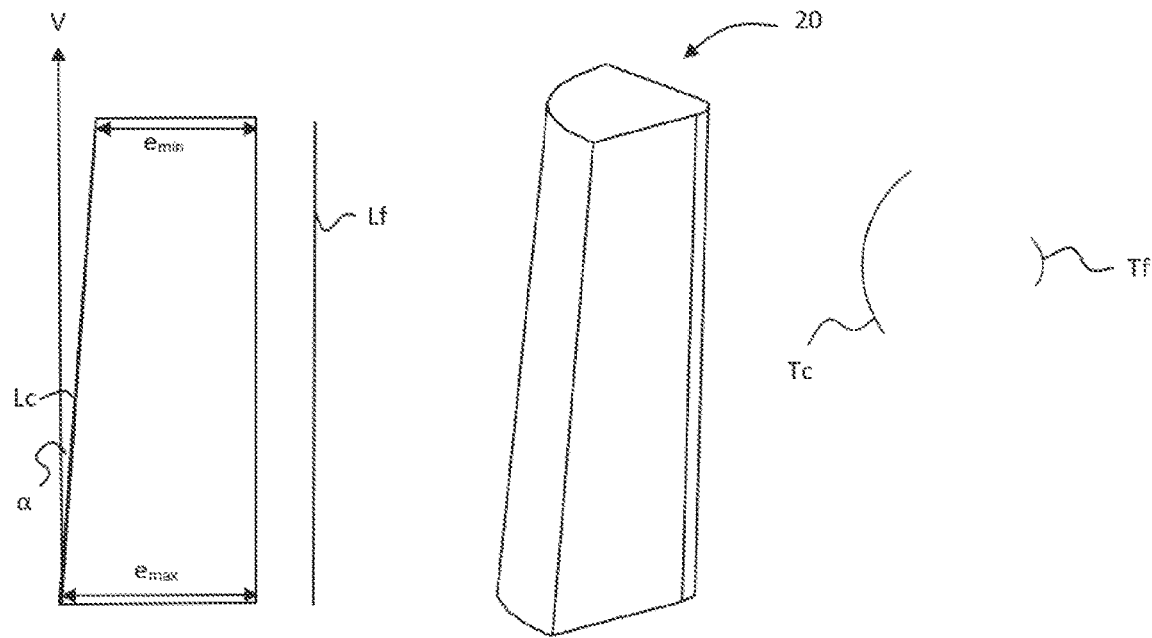
[Fig 4]
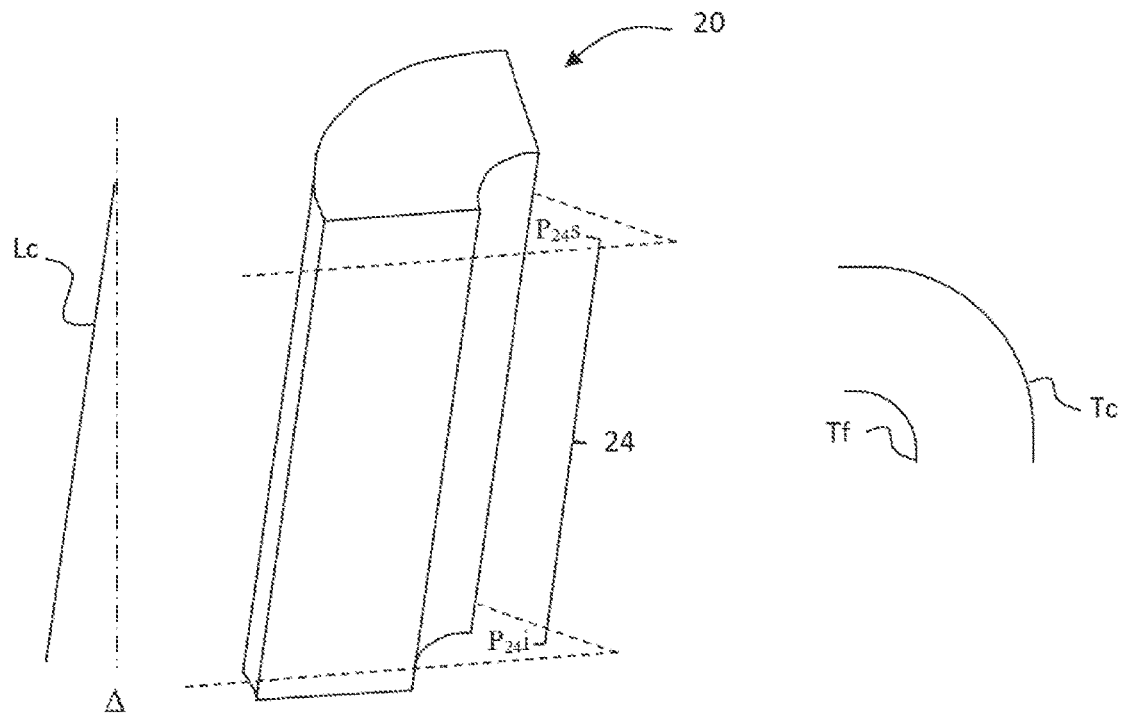

[Fig 5]
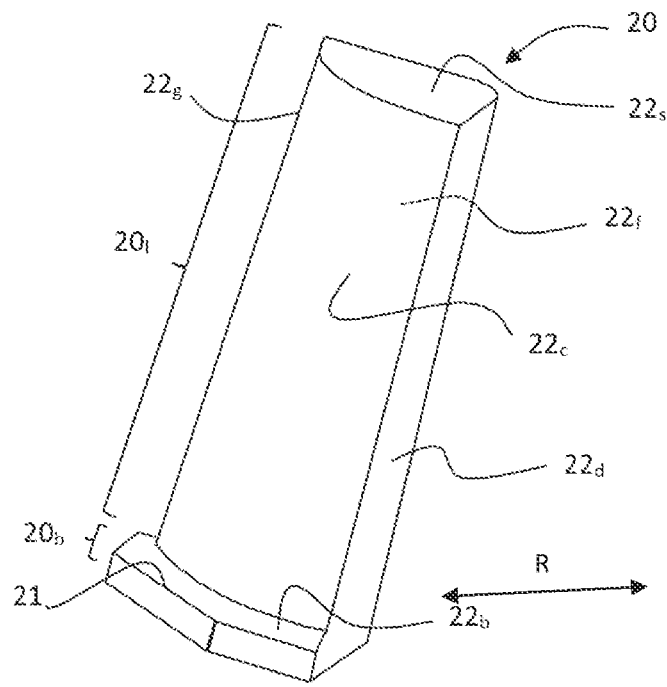
[Fig 6]
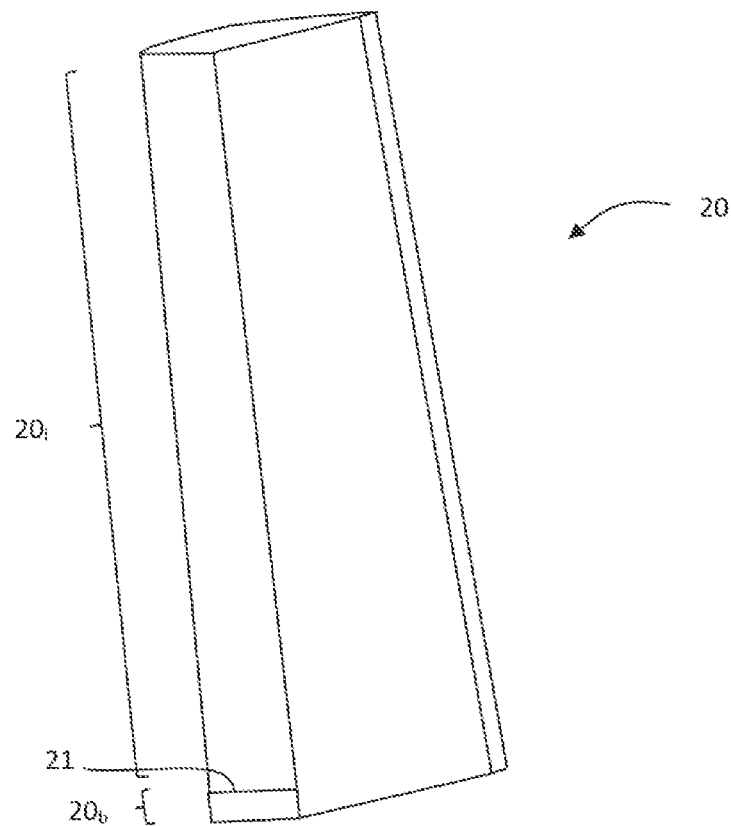

[Fig 7]
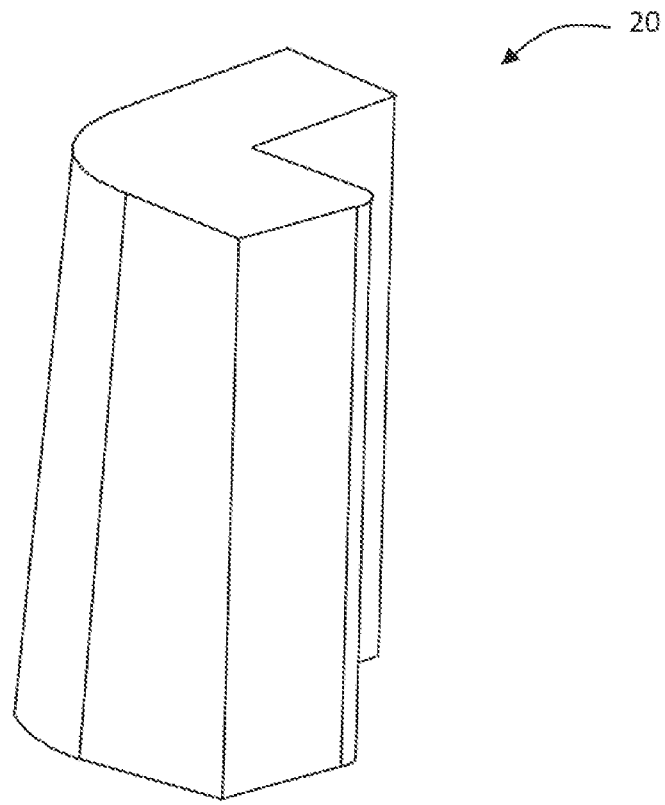
[Fig 8]
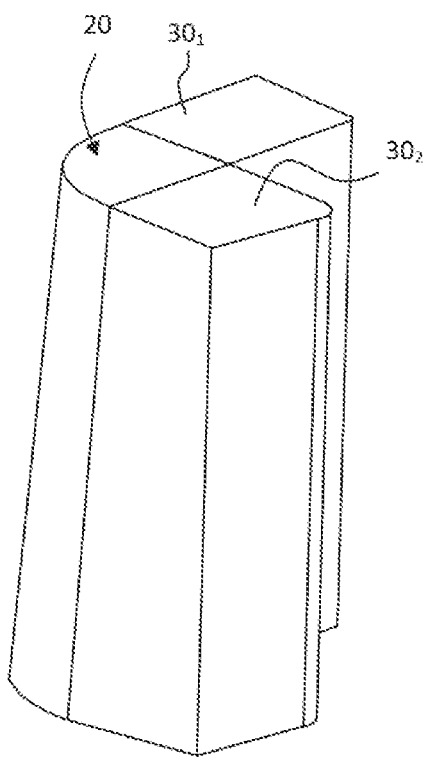

[Fig 9]
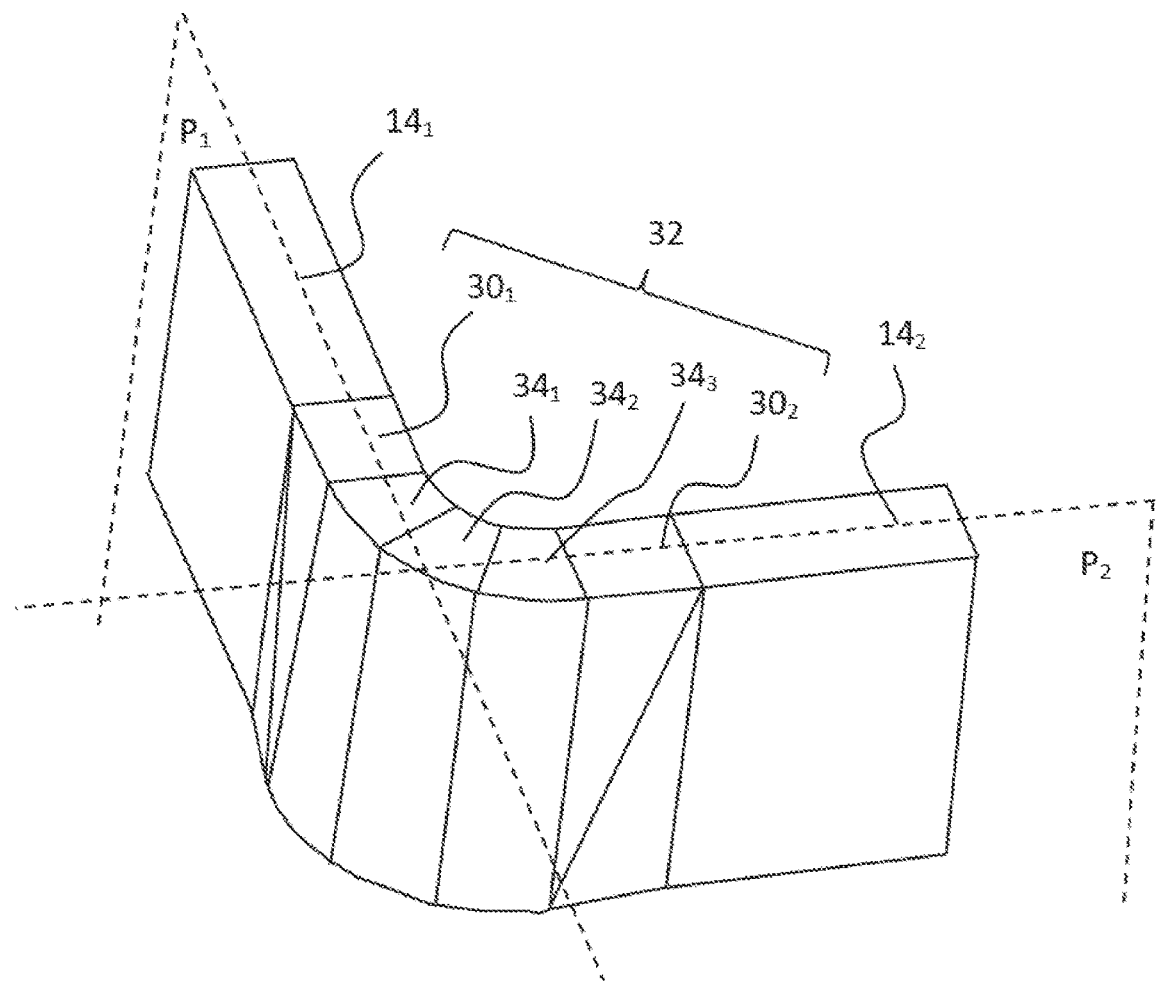
[Fig 10]
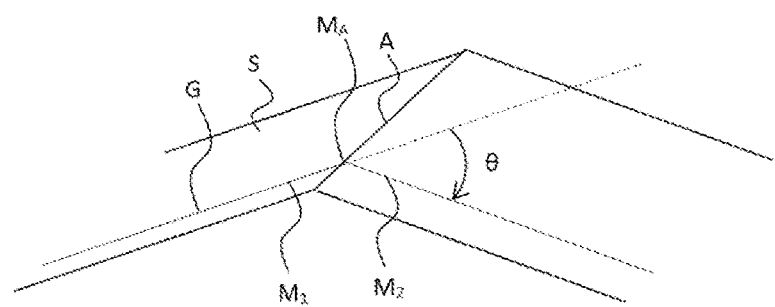

CORNER BLOCK FOR GLASS FURNACE

TECHNICAL FIELD

The invention relates to a corner block for a glass furnace, and to a glass furnace comprising such a corner block.

PRIOR ART

Many glass products are manufactured by melting and refining a vitrifiable mixture of raw materials including compounds such as oxides, carbonates, sulfates and nitrates. These two steps are carried out in furnaces of which the main structural elements are refractory products that can withstand the high temperatures and stresses encountered in these furnaces. Glass furnaces thus generally include a very large number of refractory products, arranged in different places according to their properties. For each part of the furnace, the product chosen is the one that does not cause defects making the glass unusable (which would reduce production yields) and that resists long enough to give the furnace a satisfactory service life.

A glass furnace, in particular a float furnace, comprises an elongate tank 4, topped by a vault (FIG. 1). From upstream to downstream, there is a high-temperature melting and refining zone 6, a part with a narrowed section, called a "corset" 8 in a float furnace, and then a conditioning zone at a lower temperature 10.

A vitrifiable mixture of raw materials is introduced into the upstream melting and refining zone. This mixture is transformed into a melt by means of heating devices such as burners (not shown), which are arranged in the side walls of the tank and operate alternately. The glass melt then passes through the corset into the conditioning zone, where it is brought to a suitable temperature so that it can be drawn off for further processing operations, for example shaping, drawing or floating.

The tank 4 has a vertical side wall 14 and a horizontal floor 16. The side wall 14 is typically made up of a plurality of segments in the form of side blocks, connected to each other by corner blocks 20.

The part of the side wall 14 that connects two substantially flat segments of the tank side wall together is referred to as a "corner block".

A distinction is made between the loading corner blocks $20_1$, the melting end corner blocks $20_2$, and the inlet corner blocks $20_3$ and outlet corner blocks $20_4$ of the corset.

The corner blocks are highly stressed and sometimes experience marked cracking, both vertically and horizontally. Once cracked, a corner block is subject to increased corrosion due to molten glass that can seep into the cracks. This accelerated corrosion leads to premature wear that can result in major glass leaks, and ultimately the shutdown of a furnace.

The corner block must also withstand high thermal stresses since part of the block is in a near-ambient-temperature environment, usually thanks to air blast cooling, whereas the part inside the furnace is at temperatures of about 1500° C.

In addition, the corner block undergoes thermal cycles due to maintenance operations, such as so-called "plating" operations, which require the external cooling of the furnace to be stopped and then resumed, or due to the loading of the vitrifiable mixture.

The corner block must also be resistant to corrosion by aggressive furnace vapors and condensates. In addition, the corner blocks must be resistant to erosion caused by the passage of raw materials.

To resist these stresses, the corner block is made of a refractory product.

Among refractory products, a distinction is made between fused and sintered products. Unlike sintered products, fused products usually have an intergranular glassy phase connecting crystallized grains. The problems posed by sintered and fused products, and the technical solutions adopted to solve them, are therefore generally different. A composition developed to manufacture a sintered product is therefore not a priori usable as such to manufacture a fused product, and vice versa. Fused products, often called "electrofused" products, are obtained by melting a mixture of appropriate raw materials in an electric arc furnace or by any other technique suitable for these products. The molten material is then poured into a mold and the resulting product undergoes a controlled cooling cycle.

Currently, fused products are mainly used to form the corner blocks, in particular alumina-zirconia-silica (AZS for short) products containing 30 to 45% zirconia. The microstructure of these products is fundamentally composed of alumina-alpha crystals, free zirconia crystals, corundum-zirconia eutectic crystals and an intercrystalline glassy phase.

In addition, to increase the service life of the furnace, the assembly of the refractory blocks of the furnace must be performed "dry", i.e., without jointing cement. In order to ensure a tight seal, the blocks must therefore have very precise dimensions, with a good surface finish. The blocks, and in particular the corner blocks, are therefore always machined to ensure close contact with the adjacent blocks.

However, the resistance to cracking of the corner blocks is sometimes insufficient to meet the current changes in the needs of glassmakers, who require an extension of the service life of the furnaces.

Thus, there is a need for a corner block having improved crack resistance and/or increased service life. One objective of the invention is to meet this need.

SUMMARY OF THE INVENTION

The invention relates to a corner block for a glass furnace tank, said corner block having an outer surface preferably comprising:
- upper and lower surfaces delimiting the length of the corner block,
- right and left surfaces intended to be in contact, in the operational position, with corresponding surfaces of adjacent blocks,
- a hot face intended to be in contact, in the operational position, with the environment inside said tank,
- a cold face, opposite the hot face.

According to a first main aspect of the invention, in a main portion of the corner block extending, over more than 80% of the length of the corner block, between two limiting upper and lower transverse planes, the hot face is edge-free, an edge being a line along which the hot face has a break in slope greater than 25°.

As will be discussed in more detail later in the description, the inventors have found that the absence of an edge makes it possible to reduce cracking and increase the service life of the corner block.

A corner block according to the invention can further comprise one or more of the following optional features:

the main portion extends from the upper surface to a base part intended to be integrated into a floor of the tank in the operational position, or extends from the upper surface to the lower surface of the corner block;

in the main portion, the hot face has no edge marking a break in slope greater than 10°;

in the longitudinal median sectional plane, the corner block in the main portion has a thickness decreasing from the lower transverse boundary plane to the upper transverse boundary plane, or has a constant thickness;

in the main portion, a point of the profile of the hot face in the median longitudinal sectional plane becomes increasingly distant from a vertical line passing through the upper end of said profile, the closer said point is moved towards the lower surface;

the profile of the hot face in a median longitudinal sectional plane is rectilinear and, preferably, forms an angle α of less than 30° and more than 2° with the vertical direction in the operational position;

the angle α is less than 20°, preferably less than 10%, or less than 5% and/or greater than 30°;

the hot face is strictly convex in the main portion;

in any transverse sectional plane in the main portion, the hot face has a convex profile, preferably in the shape of a circular arc, optionally extended, at one or both of its ends, by a straight segment;

the hot face has, in a transverse sectional plane, a profile of which the general shape is identical whatever the transverse sectional plane considered in the main portion;

the hot face has, in a transverse sectional plane of the main portion, a profile which is longer, the closer said transverse sectional plane is moved towards the limiting lower transverse plane;

the corner block has the general shape of a quarter-cylinder with a circular base, or a quarter-cone, or a quarter-cylinder with an annular base;

in the main portion, the cold face is edge-free.

According to a second main aspect of the invention, at least part of the cold face is thermally insulated.

A corner block according to the second main aspect of the invention can further comprise one or more of the following optional features:

a first thermally insulating material is arranged, preferably glued, on at least part of the cold face, preferably so as to cover at least part of the cold face which, in the operational position, extends from the upper surface of the corner block to the floating zone, preferably so as to cover at least the whole part of the cold face which, in the operational position, extends from the upper surface of the corner block to the floating zone;

preferably the part of the cold face covered by the first thermally insulating material extends, preferably from the upper surface of the corner block to more than 300 mm, preferably more than 400 mm, preferably more than 500 mm, and/or less than 800 mm, preferably less than 600 mm from the upper surface;

preferably, the first thermally insulating material is in the form of a slab;

preferably, the first thermally insulating material has a thermal conductivity of less than 1.0 W·m$^{-1}$·K$^{-1}$, or less than 0.7 W·m$^{-1}$·K$^{-1}$, or less than 0.5 W·m$^{-1}$·K$^{-1}$;

according to another variant, the first thermally insulating material is made of a refractory material with a thermal conductivity of less than 7.0 W·m$^{-1}$·K$^{-1}$;

preferably, the thickness of the first thermally insulating material, preferably in the form of a slab, is less than or equal to 100 mm, or less than or equal to 50 mm, or less than or equal to 30 mm, or less than or equal to 20 mm, or less than or equal to 10 mm, or less than 5 mm and/or greater than 1 mm;

a second thermally insulating material is arranged, preferably glued, on at least part of the cold face, preferably so as to cover at least part of the cold face which, in the operational position, extends below the flotation zone, preferably so as to cover at least the whole part of the cold face which, in the operational position, extends below the flotation zone;

preferably the part of the cold face covered by the second thermally insulating material extends, preferably from the lower surface of the corner block, to more than 500 mm, preferably more than 600 mm, preferably more than 700 mm, and/or less than 800 mm from the lower surface;

preferably, the second thermally insulating material is in the form of a slab;

preferably, the second thermally insulating material has a thermal conductivity of less than 8 W·m$^{-1}$·K$^{-1}$, or less than 6 W·m$^{-1}$·K$^{-1}$, or less than 1 W·m$^{-1}$·K$^{-1}$;

the second insulating material is an AZS-type material comprising more than 80% $ZrO_2$ in weight percent, and preferably in which, in weight percent on an oxide basis, the total content of $Al_2O_3+ZrO_2+SiO_2$ is more than 80.0%, preferably more than 84.0%, preferably more than 86.0%, and/or less than 97.0% or less than 95.0% or less than 94.0%;

preferably, the thickness of the second thermally insulating material, preferably in the form of a slab, is less than or equal to 200 mm, or less than or equal to 100 mm, or less than or equal to 50 mm, or less than or equal to 30 mm, or less than or equal to 20 mm, or less than or equal to 10 mm, or less than 5 mm and/or greater than 1 mm;

preferably, the thickness and/or the thermal conductivity of the layer of second thermally insulating material are such that the thermal insulation is greater than that provided by the layer of first thermally insulating material;

the entire cold face is covered by a thermally insulating material, the upper part of the cold face being more thermally insulated, preferably with a said first thermally insulating material, than the lower part of the cold face, preferably insulated with a said second thermally insulating material, the boundary between the zones covered by first thermally insulating material and by second thermally insulating material being preferably in a strip of less than 20 cm, preferably of less than 10 cm in height in the flotation zone.

Of course, the various main aspects of the invention can be combined.

Regardless of the main aspect of the invention under consideration, a corner block according to the invention may further comprise one or more of the following optional features:

the corner block has a chemical composition, in weight percent on an oxide basis, such that:

$Al_2O_3+ZrO_2+SiO_2>80.0\%$;

the corner block has a chemical composition comprising, by weight percent on an oxide basis, more than 0.5% and less than 10.0% of a zirconia stabilizer;

the corner block has a chemical composition, in weight percent on an oxide basis, such that, for a total of 100%:

$Al_2O_3+ZrO_2+SiO_2$: more than 84.0% and less than 99.7%,
$Y_2O_3$: less than 5.0%,
$Na_2O+K_2O$: less than 1.5%,
$B_2O_3$: less than 0.6%,
oxide species other than $Al_2O_3$, $ZrO_2$, $SiO_2$, $Y_2O_3$, $Na_2O$, $K_2O$ and $B_2O_3$: less than 10.0%;
the oxide species other than $Al_2O_3$, $ZrO_2$, $SiO_2$, $Y_2O_3$, $Na_2O$, $K_2O$ and $B_2O_3$ are CaO, MgO, SrO, BaO, $TiO_2$, $Fe_2O_3$, and $SnO_2$, it being possible for one or more of these species to be absent;
the corner block has a chemical composition, in weight percent on an oxide basis, such that:
$ZrO_2$: more than 12.0% and less than 45.0%,
$SiO_2$: more than 8.0% and less than 24.0%,
$Al_2O_3$: more than 35.0% and less than 60.0%.

The invention further relates to a manufacturing process comprising the following successive steps:
a) mixing raw materials so as to form a feedstock;
b) melting said feedstock until a bath of molten material is obtained;
c) casting said molten material into a mold, preferably at room temperature, and solidifying said molten material by cooling, so as to obtain an intermediate part having the general form of a corner block;
d) demolding the intermediate part, then
e) preferably machining, preferably partially, the outer surface of the intermediate piece so as to obtain a corner block according to the invention or a piece of a corner block according to the invention.

Preferably, the mold is made by 3D printing, so as to obtain a block having the desired shape.

The invention also relates to a corner block produced or capable of having been produced by a process according to the invention.

The invention further relates to a corner device comprising a corner block according to the invention and an adapter block having a first face in contact with the left or right surface of the corner block, and a second face, parallel and opposite to the first face, and having a shape different from said first face.

The shape of the left or right surface is preferably that of the surface of an adjacent block with which said left or right surface is in contact in the operational position.

The invention further relates to a method for producing a furnace comprising a corner block according to the invention.

Lastly, the invention relates to a glass furnace comprising a tank comprising a side wall comprising two segments and a corner block according to the invention, or a corner device according to the invention, connecting said two segments.

Preferably the corner block or corner device is arranged at the corset entrance or at the loading point. Preferably the corner block is a loading corner block.

When the glass furnace is in use, the corner block or corner device are at least partially in contact with molten glass.

Definitions

The "operational position" is the position in which the corner block is integrated in a side wall of a glass furnace tank, so as to connect two segments of said side wall to each other.

The height of the flotation line varies when the glass furnace is in operation. The "flotation zone" is delimited by the maximum and minimum flotation line heights when the glass furnace is in operation.

The adjectives "right" and "left", "hot" and "cold" are used for clarity. Before the furnace is put into operation, the "hot" face is the face that is intended to be subjected to the environment inside the furnace, i.e., the highest temperatures after start-up.

"Lower" and "upper", "inner" and "outer", "horizontal" and "vertical" refer to orientations or positions when the corner block is in its operational position, in a glass furnace.

The terms "horizontal" and "vertical" mean an orientation forming an angle of less than 5°, or less than 2°, or less than 1°, respectively, with a perfectly horizontal and vertical plane.

The length direction of a corner block is the direction that extends vertically when the corner block is in the operational position. This direction is represented by the arrow V in the figures.

A transverse plane is a plane perpendicular to the length direction of the corner block.

The median transverse plane is the mid-length transverse plane of the corner block.

In a transverse sectional plane, the width of a corner block is measured along the line that extends halfway between the hot and cold faces. In the figures, this line, known as the "width line," is represented by the line X.

In a transverse sectional plane, the thickness is measured perpendicularly to the width line X.

A longitudinal plane is a plane that includes the length direction and, in a transverse plane, is perpendicular to the width line X of the corner block. The median longitudinal plane is the mid-width longitudinal plane, with the width being defined in the median transverse sectional plane.

A "sectional" plane is a plane that cuts through a block and provides a view of the cut block.

The "edges" of a surface consist of the points on that surface at which a line of greatest slope has a change in slope, also called a "break in slope", greater than 25°. The term "extension" means that the surface is also said to have a break in slope greater than 25°. For example, FIG. 10 shows a surface S on which the line of greatest slope G has a break in slope of $\theta$ at any point $M_A$ of the line A. If the angle $\theta$ is greater than 25° for all points on the line A, line A is an edge. In practice, it is possible to measure the change in slope between two points $M_1$ and $M_2$ on the line of greatest slope separated by a distance of 3 mm, with the 3 mm distance being measured along said line.

The term "machining" means an operation by which the surface of a refractory part is machined in order to obtain a precise surface geometry. Classically, and in a particular embodiment of the invention, the machining leads to the removal of at least the skin.

For the sake of clarity, the chemical formulas of the oxides are used to denote the contents of these oxides in a composition. For example, '$ZrO_2$', "$SiO_2$", or "$Al_2O_3$" denote the contents of these oxides, and "zirconia", "silica", and "alumina" are used to denote phases of these oxides formed of $ZrO_2$, $SiO_2$, and $Al_2O_3$, respectively.

Unless otherwise stated, all oxide contents in a corner block according to the invention are in weight percent on an oxide basis. A mass content of an oxide of a metallic element refers to the total content of that element expressed as the most stable oxide, according to the usual industry convention.

In a molten product, the oxides classically represent more than 95%, more than 97%, more than 99%, preferably substantially 100% of the mass.

$HfO_2$ is not chemically dissociable from $ZrO_2$. However, according to the present invention, $HfO_2$ is not voluntarily added. $HfO_2$ therefore denotes only trace amounts of hafnium oxide, as this oxide is always naturally present in zirconia sources in a weight percent generally less than 5%, generally less than 2%. In a block according to the invention, the mass content of $HfO_2$ is preferably less than 5%, preferably less than 3%, most preferably less than 2%. For the sake of clarity, the total content of zirconium oxide and trace amounts of hafnium oxide may be referred to synonymously as "$ZrO_2$" or as "$ZrO_2+HfO_2$". $HfO_2$ is therefore not included in "oxide species other than $ZrO_2$, $SiO_2$, $Al_2O_3$, $Na_2O$, $B_2O_3$ and $Y_2O_3$".

The terms "comprise," "define," "have" or "contain" shall be construed broadly, not restrictively.

Unless otherwise specified, the definition of a feature that applies to the main portion does not exclude that feature for the rest of the corner block.

BRIEF DESCRIPTION OF THE FIGURES

Further features and advantages of the invention will become apparent from the following detailed, non-limiting description and from an examination of the attached drawing in which:

FIG. 1 shows a schematic plan view of a glass melting tank;

FIG. 2 shows schematically, in perspective, a first embodiment of a corner block according to the invention;

FIG. 3 shows schematically, in perspective, a second embodiment of a corner block according to the invention;

FIG. 4 shows schematically, in perspective, a third embodiment of a corner block according to the invention;

FIG. 5 shows schematically, in perspective, a fourth embodiment of a corner block according to the invention;

FIG. 6 shows schematically, in perspective, a fifth embodiment of a corner block according to the invention;

FIG. 7 shows schematically, in perspective, a sixth embodiment of a corner block according to the invention;

FIG. 8 shows schematically, in perspective, a seventh embodiment of a corner block according to the invention;

FIG. 9 schematically shows, in perspective, a corner device according to the invention comprising a corner block according to the invention and adapter blocks, in the operational position; and FIG. 10 illustrates the definition of an edge.

In the various figures, identical or similar references are used to designate identical or similar parts or portions of parts.

DETAILED DESCRIPTION

Form

By definition, a corner block 20 or corner device 32 connects together two segments $14_1$ and $14_2$ of the tank side wall 14, partially shown in FIG. 8. When viewed from above, the two segments join the corner block or corner device along segment planes $P_1$ and $P_2$, respectively. The segment planes $P_1$ and $P_2$ form an angle with each other greater than 45°, preferably greater than 70°, preferably greater than 80°, and/or less than 135°, preferably less than 110°, preferably less than 120°, typically about 90°.

As shown in FIGS. 5 and 6, a corner block 20 comprises a side part $20_1$, intended to be integrated into the side wall 14 of the tank, and a base part $20_b$ intended to rest on the ground and be integrated in the floor of the tank. The base part can have edges 21, particularly when it projects beyond the hot face, in the form of a flange, as shown in FIG. 5.

The base part can also be indistinguishable from the side part, as in FIGS. 2 to 4.

The outer surface of a corner block 20 comprises:
an upper surface 22s and lower surface 22i, typically horizontal, delimiting the length $L_{20}$ of the corner block,
right and left surfaces, 22d and 22g, typically vertical, which in the operational position are in contact with corresponding surfaces of adjacent blocks,
an inner side surface, or "exposed surface", also called the "hot face" 22c, which belongs to the inner surface of the side wall 14 of the tank and which, in the operational position, is in contact with the environment inside the tank,
optionally, an inner base surface 22b which, in the operational position, is also in contact with the environment inside the tank, but which belongs to the floor (see for example FIG. 5),
an outer surface, also called the "cold face" 22f, which is opposite the hot face 22c and which, in the operational position, is in contact with the environment outside the tank.

Preferably, the upper surface 22s, which is typically flat, delimits the top edge of the side wall of the tank.

Preferably, the lower surface 22i, which is typically flat, rests on the ground.

Preferably, the right and left surfaces, 22d and 22g, are flat. Usually, they extend in planes forming between them an angle greater than 45°, preferably greater than 70°, preferably greater than 80°, and/or less than 135°, preferably less than 110°, preferably less than 120°, usually about 90°.

The right and left surfaces, 22d and 22g, are usually perpendicular to the segment planes $P_1$ and $P_2$, respectively.

In a corner block, each of the right and left surfaces 22d and 22g is machined. A machined surface therefore does not have a skin microstructure.

Preferably, only those surfaces which, in the operational position, are in contact with corresponding surfaces of adjacent blocks are machined. Preferably, all surfaces which, in the operational position, are in contact with corresponding surfaces of adjacent blocks are machined.

The invention relates to the side portion $20_1$, which typically extends from the upper surface of the corner block to the base part $20_b$, typically over 90% of the length of the corner block. Therefore, the features described below refer to a main portion 24 of the corner block that extends between two limiting upper and lower transverse planes, referenced $P_{24}s$ and $P_{24}i$, respectively, shown in FIG. 4 for example.

Preferably, the main portion 24 extends, between the two limiting upper and lower transverse planes $P_{24}s$ and $P_{24}i$, over more than 80%, preferably more than 90%, preferably more than 95%, preferably 100% of the length of the block. In particular, in the embodiments shown in FIGS. 2 to 4, the two limiting upper and lower transverse planes can be the upper 22s and lower 22i surfaces, respectively.

Preferably, the main portion extends from the upper surface. Preferably, the main portion extends, along the length direction, to the base part of the corner block.

Preferably, the main portion extends from the upper surface to less than 20 cm, preferably less than 10 cm, most preferably less than 5 cm from the lower surface.

According to the invention, the hot face is edge-free in the main portion.

The hot face is oriented towards the inside of the tank. It is intended to be placed at least partially in contact with molten glass.

Preferably, the hot face does not have a soft edge in the main portion, an edge being soft when it delimits a break in slope of less than 15°, preferably less than 10°, preferably less than 5°, preferably less than 1°.

In the median longitudinal sectional plane $Pl_{50}$, the corner block has a length $L_{20}$ preferably greater than 0.5 m, preferably greater than 0.8 m, preferably greater than 1.0 m, preferably greater than 1.2 m, and/or less than 2.0 m, preferably less than 1.7 m (the section in this plane is shown on the left-hand side of FIGS. 2 and 3).

The corner block 20 has a thickness $e_{20}$, measured in the median longitudinal sectional plane $Pl_{50}$ and in the median transverse sectional plane $Pt_{50}$, preferably greater than 200 mm, preferably greater than 250 mm and/or less than 500 mm, preferably less than 450 mm.

Preferably, the thickness $e_m$ of the corner block, measured at the intersection between the median transverse sectional plane $Pt_{50}$ and the longitudinal sectional plane passing through a point M of the width line X of the corner block, varies by less than 20%, preferably less than 10%, preferably less than 5%, preferably less than 1% with respect to $e_{20}$ as the point M traverses the width line X. That is to say, $|e_m-e_{20}|/e_{20}<20\%$, preferably $|e_m-e_{20}|/e_{20}<10\%$, preferably $|e_m-e_{20}|/e_{20}<5\%$, preferably $|e_m-e_{20}|/e_{20}<1\%$, regardless of the thickness $e_m$ measured along the width line X.

In the median longitudinal sectional plane $Pl_{50}$, the corner block can have a constant thickness in any position considered in the direction of the length of the corner block, i.e., in any transverse sectional plane considered, at least in the main portion, as shown for example in FIG. 2. This simplifies the production of the corner block.

In the median longitudinal sectional plane $Pl_{50}$, the corner block 20 may have a varying thickness depending on the position considered along the length direction of the corner block.

Preferably, in the median longitudinal sectional plane $Pl_{50}$, the corner block has, at least in the main portion, an increasing thickness, preferably a steadily increasing thickness, as it descends in the direction of the length of the corner block, as shown for example in FIG. 3.

Preferably, $(e_{max}-e_{min})/e_{min}>10\%$, and/or, preferably, $(e_{max}-e_{min})/e_{min}<30\%$, or $(e_{max}-e_{min})/e_{min}<20\%$, with $e_{max}$ and $e_{min}$ designating, respectively, the maximum and the minimum thickness in the median longitudinal sectional plane $Pl_{50}$ (see FIG. 2). This significantly improves the service life of the corner block.

In a preferred embodiment, the profile Lc of the hot face in the median longitudinal sectional plane $Pl_{50}$ is substantially rectilinear. Preferably, it forms, with the vertical direction V, an angle α of less than 30°, preferably less than 20°, preferably less than 10°, or less than 5°, and/or preferably more than 2°, preferably more than 3° (as shown, for example, in FIG. 3).

In one embodiment, the profile Lc of the hot face in the median longitudinal sectional plane $Pl_{50}$, for example concave or rectilinear, is shaped to run inwardly into the tank as it approaches the lower surface 22i.

As shown, for example, in FIG. 4, a point on the profile Lc of the hot face, in the median longitudinal sectional plane $Pl_{50}$, may become increasingly distant from a vertical line A passing through the upper end of said profile Lc, the closer said point is moved towards the lower surface 22i.

In one embodiment, the profile Lf of the cold face in the median longitudinal sectional plane is substantially rectilinear. Preferably, it forms, with the vertical direction V, an angle of less than 10°, preferably less than 5°, preferably less than 2°, preferably substantially zero, as shown, for example, in FIG. 3.

In the median transverse sectional plane $Pt_{50}$, the hot face has a profile Tc, which is shown on the right-hand side of FIGS. 2 to 4 for clarity.

The profile of the hot face can be the same, regardless of the transverse sectional plane chosen in the main portion, as for example in FIGS. 2 and 4. Preferably, it results from a homothetic deformation of the profile Tc (defined in the median transverse sectional plane $Pt_{50}$), for example as in FIG. 3 or in FIG. 5. Preferably, the homothety ratio increases, preferably evenly, from the limiting upper transverse plane to the limiting lower transverse plane. In other words, the profile lengthens whilst moving down the corner block, maintaining its general shape, for example as in FIGS. 3 and 5.

Preferably, the profile Tc is strictly convex over more than 80%, preferably more than 90%, preferably 100% of its length. In one embodiment, the hot face does not have a flat zone, as in FIGS. 1 to 3.

Preferably, the profile Tc does not have a strictly concave portion.

Preferably, the profile Tc has no singular point, i.e., no break in slope.

Preferably, the profile Tc is substantially symmetrical with respect to the median longitudinal sectional plane, as in the embodiments of FIGS. 1 to 4.

In one embodiment, the profile Tc has the shape of a circular arc (FIGS. 2 and 3). The circular arc can be extended by straight line segments (FIG. 4).

In the median transverse sectional plane $Pt_{50}$, the cold face has a profile Tf, shown on the right-hand side of FIGS. 2 to 4 for clarity.

Preferably, the profile of the cold face is the same regardless of the transverse sectional plane chosen in the main portion.

The profile Tf can be strictly convex (FIGS. 2 and 3). Preferably, however, the profile Tf is flat or strictly concave (FIG. 4), which improves the mechanical strength.

Preferably, the profile Tf has no singular point, i.e. no break in slope.

Even more preferably, the profile Tf is substantially symmetrical with respect to the median longitudinal plane, as in the embodiments of FIGS. 2 to 4.

In one embodiment, the profile Tf has the shape of a circular arc (FIGS. 2 and 3). The circular arc can be extended by straight segments (FIG. 4).

In one embodiment, in the median transverse sectional plane, the distance between the profiles of the hot and cold faces is constant, regardless of the longitudinal sectional plane considered.

The features described above relating to the shape of the corner block and defined with reference to the median longitudinal sectional plane are preferably applicable in any longitudinal sectional plane between two limiting longitudinal planes defined with respect to the width line X (in the median transverse sectional plane), the distance between the limiting longitudinal planes preferably being greater than 60%, preferably greater than 70%, preferably greater than 80%, preferably greater than 90% of the width of the corner block (distance between the right and left faces, following the width line X in the median transverse sectional plane).

The features described above relating to the shape of the corner block in the median longitudinal sectional plane are preferably applicable regardless of the longitudinal sectional plane considered.

The features described above and defined with reference to the median transverse sectional plane are preferably applicable regardless of the transverse sectional plane considered in the main portion.

The right and left surfaces are usually the same shape as the surfaces of the side blocks with which they are in contact. Thus, internally, the tank does not have any roughness resulting from a gap between the blocks. Usually, the surfaces of the adjacent side blocks are substantially rectangular in outline. In particular, when the profile Lc causes a widening of the corner block in the lower part (FIG. 4 for example), it is therefore necessary to join a rectangular contour in the longitudinal planes in which the right and left surfaces extend, as shown in FIG. 7 for example.

The corner block 20 can be formed of one or more pieces. In particular, it can be an assembly of a plurality of elementary blocks 341, 342 and 343, the faces at the right and left ends of the assembly being oriented perpendicularly to the planes $P_1$ and $P_2$, respectively.

In one embodiment, adapter blocks 301 and 302 are added to the corner block according to the invention, so as to form a corner device 32 according to the invention, as shown in FIG. 8. In particular, the adapter blocks can be configured so that the right and left surfaces of the corner device are identical to those of adjacent side blocks $14_1$ and $14_2$, respectively.

The corner device 32 may thus comprise a one-piece corner block or, as shown in FIG. 8, an assembly of elementary blocks, and one or more adapter blocks so as to match the shape of the surfaces at the right and left ends of the corner device to the faces of adjacent, facing blocks.

In the embodiment shown in FIG. 2, the corner block has the general shape of a quarter-cylinder with a circular base and vertical axis, a quarter of such a cylinder being a piece of the cylinder body after it has been cut by two planes perpendicular to each other and passing through its axis.

In the embodiment shown in FIG. 3, the corner block has the general shape of a quarter-cone with a vertical axis, a quarter-cone being a piece of the cone after it has been cut by two planes perpendicular to each other and passing through its axis.

In the embodiment shown in FIG. 4, the corner block has the general shape of a quarter-cylinder with an annular base and vertical axis, a quarter of such a cylinder being a piece of the cylinder body after it has been cut by two planes perpendicular to each other and passing through its axis.

According to one embodiment, the corner block is provided with an anchoring device for anchoring in the metal shell of the glass furnace. This anchoring device is for example a screw, a hook, a metal plate, or a notch.

Of course, the dimensions and shapes described above are not limiting.

Composition

Preferably, the corner block according to the invention comprises, preferably consists of, an electrofused material consisting, for more than 80% of its mass, of alumina, zirconia, silica and possibly a zirconia stabilizer, in particular yttrium oxide. The material can be of the AZS type or with a very high zirconia content (typically comprising more than 80% of $ZrO_2$ in weight percent).

In one embodiment, the corner block according to the invention comprises more than 0.5%, more than 1.5%, more than 3.0%, more than 4.0%, more than 5.0%, or more than 6.0%, and/or less than 10.0%, less than 9.0%, or less than 8.0% of zirconia stabilizer, in particular CaO and/or $Y_2O_3$ and/or MgO and/or $CeO_2$, preferably $Y_2O_3$ and/or CaO, preferably $Y_2O_3$.

Preferably, the corner block according to the invention has a chemical composition, in weight percent on an oxide basis, such that, for a total of 100%,
- $Al_2O_3+ZrO_2+SiO_2$: more than 80.0%, preferably more than 84.0%, preferably more than 86.0%, and/or less than 97.0%, or less than 95.0%, or less than 94.0%, and/or
- $Y_2O_3$: more than 0.5%, more than 1.5%, more than 2.0% and/or less than 5.0%, less than 4.0%, or less than 3.0%, and/or
- $Na_2O$: more than 0.1%, or more than 0.2%, and/or less than 0.6%, preferably less than 0.5%, or less than 0.4%, and/or
- $B_2O_3$: more than 0.1%, or more than 0.2%, and/or less than 0.6%, preferably less than 0.5%, or less than 0.4%, and/or
- oxide species other than $Al_2O_3$, $ZrO_2$, $SiO_2$, $Y_2O_3$, $Na_2O$ and $B_2O_3$: less than 10.0%, preferably less than 9.0%, preferably less than 8.0%, less than 5.0%, or less than 3.0%, or less than 2.0%, or less than 1.0%, or less than 0.5%.

According to one embodiment, the corner block according to the invention has a chemical composition such that:
- $ZrO_2$: more than 12.0%, preferably more than 20.0%, preferably more than 25.0% and/or less than 80.0% or less than 75.0% and/or
- $SiO_2$: more than 6.0%, preferably more than 10.0% and/or less than 24.0%, or less than 20.0%, and/or
- $Al_2O_3$: more than 18.0%, preferably more than 25.0% and/or less than 60.0%, preferably less than 50.0%.

According to one embodiment, the corner block according to the invention has a chemical composition such that:
- $ZrO_2$: more than 12.0%, preferably more than 15.0%, preferably more than 18.0%, or more than 22.0%, and/or less than 45.0%, or less than 40.0%, or less than 35.0%, or less than 30.0%, or less than 25.0%, and/or
- $SiO_2$: more than 8.0%, preferably more than 10.0%, preferably more than 12.0%, and/or less than 24.0%, or less than 20.0%, less than 17.0%, or less than 14.0%, and/or
- $Al_2O_3$: more than 35.0%, preferably more than 38.0%, or more than 40.0%, and/or less than 60.0%, preferably less than 55.0%, or less than 50.0%, less than 46.0%, or less than 44.0%.

According to one embodiment, the corner block according to the invention has a chemical composition such that:
- $ZrO_2$: more than 80.0%, preferably more than 83.0%, preferably more than 86.0%, and/or less than 97.0%, or less than 95.0%, or less than 94.0%, and/or
- $SiO_2$: more than 0.5%, preferably more than 1.5%, preferably more than 2.5%, preferably more than 4.0%, or more than 6.0%, more than 8.5%, and/or less than 15.0%, or less than 12.0%, less than 10.0%, or less than 8.0%, and/or
- $Al_2O_3$: more than 0.2%, preferably more than 1.0%, and/or less than 3.0%, preferably less than 2.0%.

EXAMPLES

Modeling tests were conducted with a finite element software (Ansys 17.0).

With this software, the temperature and stresses of AZS refractory blocks, with a length of 1300 mm and a chemical composition with 40% $ZrO_2$ (ER 1711 from Saint-Gobain SEFPRO), were determined when the hot face of the block is at a temperature of 1500° C., with heat evacuation by air blowing at room temperature (20° C.) and with a heat transfer coefficient of 125 W/($m^2$·K). Three block geometries were compared:

- a straight block (rectangular parallelepipedic block), with a square base of 450 millimeters on each side ("reference" in table 1 below);
- a rounded block, representing a quarter cone, of the type shown in FIG. 3, the radius of the profile of the hot face being 450 millimeters at the upper surface and 550 millimeters at the lower surface (example 1);
- the block of example 1 having, on the cold face, a plate of an insulating material 10 millimeters thick (thermal conductivity of 0.5 W/(m·K) (example 2).

The stress state of each point in the block can be represented by a tensor, the stress tensor. The principal stresses are the stresses expressed in a base such that the stress tensor is a diagonal matrix. The coefficient of this matrix that corresponds to the highest (positive) tensile stress is called the 'first principal stress'. The criticality of the stresses was evaluated by the maximum Rmax of the ratio R of the first principal stress to the stress at failure (MOR), considering all ratios R along the most stressed edge. The MOR is measured in air, at the considered temperature, on a specimen of dimensions 80*20*20 $mm^3$ in a 3-point bending set-up realized with a distance of 70 mm between the two lower supports, and the punch descent speed is equal to 0.5 mm/min. The higher the Rmax, the more likely the failure. The results are given in Table 1.

TABLE 1

|  | Rmax | Decrease compared to the reference |
|---|---|---|
| Reference | 3.0 |  |
| Example 1 | 2.0 | 33% |
| Example 2 | 1.3 | 57% |

The tests thus show that a corner block according to the invention makes it possible to reduce the stresses significantly.

The invention is particularly well suited to corset entrance blocks.

It goes without saying that the embodiments described are only examples and could be modified, in particular by substitution of technical equivalents, without thereby departing from the scope of the invention.

The invention claimed is:

1. A glass furnace comprising a tank comprising a side wall comprising a corner block, said corner block having an outer surface comprising:
    upper and lower surfaces delimiting the length of the corner block,
    right and left surfaces in contact, in the operational position, with corresponding surfaces of adjacent blocks,
    a hot face intended to be in contact, in the operational position, with the environment inside said tank, said hot face being separated of said right and left surfaces by hot face right and left boundaries, respectively,
    a cold face, opposite the hot face,
    the corner block being characterized in that in a main portion of the corner block extending, over more than 80% of the length of the corner block, between two limiting upper and lower transverse planes, the surface of the hot face extending between said hot face right and left boundaries is edge-free,
    an edge being a line along which the hot face has a break in slope greater than 25°, the hot face having a profile that is convex in any transverse sectional plane in the main portion, at least a part of said profile being strictly convex.

2. The glass furnace as claimed in claim 1, wherein the main portion extends from the upper surface to a base part integrated in a floor of the tank in the operational position.

3. The glass furnace as claimed in claim 1, wherein, in the main portion, the surface of the hot face extending between said right and left boundaries is devoid of line marking a change in slope greater than 10°.

4. The glass furnace as claimed in claim 1, said corner block having, in a median longitudinal sectional plane, in the main portion, a thickness decreasing from the limiting lower transverse plane to the limiting upper transverse plane.

5. The glass furnace as claimed in claim 1, wherein, in the main portion, a point of the profile of the hot face in a median longitudinal sectional plane becomes increasingly distant from a vertical line passing through the upper end of the said profile, the closer said point is moved towards the lower surface.

6. The glass furnace as claimed in claim 1, wherein, in the main portion, the profile of the hot face in a median longitudinal sectional plane is rectilinear and forms, with the vertical direction V, an angle α of less than 30° and greater than 2°.

7. The glass furnace as claimed in claim 6, wherein the angle α is less than 20° and greater than 5°.

8. The glass furnace as claimed in claim 1, wherein the hot face is strictly convex in the main portion.

9. The glass furnace as claimed in claim 1, wherein, in any transverse sectional plane in the main portion, the hot face has a convex profile in the form of a circular arc, optionally extended, at one or both of its ends, by a straight segment.

10. The glass furnace as claimed in claim 1, wherein the hot face has, in a transverse sectional plane, a profile of which the general shape is identical whatever the transverse sectional plane considered in the main portion.

11. The glass furnace as claimed in claim 1, wherein the hot face has, in a transverse sectional plane of the main portion, a profile which is longer, the closer said transverse sectional plane is moved towards the lower limiting transverse sectional plane.

12. The glass furnace as claimed in claim 1, the corner block having the general shape of a quarter-body cylinder with a circular base, or a quarter-body cone, or a quarter-body cylinder with an annular base.

13. The glass furnace as claimed in claim 1, said cold face being separated of said right and left surfaces by cold face right and left boundaries, respectively, wherein in the main portion, the surface of the cold face extending between said cold face right and left boundaries is edge-free.

14. The glass furnace as claimed in claim 1, wherein a first thermally insulating material having a thermal conductivity of less than 7.0 $W·m^{-1}·K^{-1}$ is disposed on a portion of the cold face that extends from the upper surface of the corner block to more than 300 mm from said upper surface.

15. The glass furnace as claimed in claim 1, comprising and an adapter block having a first face in contact with the left surface or the right surface of the corner block, and a second face, parallel to and opposite the first face, and having a shape different from said first face.

16. The glass furnace as claimed in claim 1, wherein the tank defines a corset, the corner block being disposed at the corset entrance.

17. The glass furnace as claimed in claim 1, wherein the tank comprises a side wall comprising two segments, said corner device connecting said two segments.

18. The glass furnace as claimed in claim 17, wherein the tank defines a corset, the corner device being disposed at the corset entrance.

\* \* \* \* \*